United States Patent [19]
Tanner et al.

[11] Patent Number: 6,050,576
[45] Date of Patent: Apr. 18, 2000

[54] GROUND LEVEL LOADING CART

[76] Inventors: Thomas J. Tanner; Theodore R. Tanner, both of 6903 Kitty La., Paradise, Calif. 95969

[21] Appl. No.: 09/028,656

[22] Filed: Feb. 24, 1998

[51] Int. Cl.[7] ..................................................... B62B 1/14
[52] U.S. Cl. ................................... 280/47.21; 280/47.26; 414/490
[58] Field of Search ..................... 254/131, 120, 254/123; 414/444, 457, 490; 280/47.26, 47.23, 43.11, 642, 43.24, 47.21

[56] References Cited

U.S. PATENT DOCUMENTS

| | | | |
|---|---|---|---|
| 263,331 | 8/1882 | Gard | 280/47.23 X |
| 1,006,985 | 10/1911 | Smith . | |
| 1,015,969 | 1/1912 | McCrary . | |
| 1,029,365 | 6/1912 | Hazard . | |
| 1,430,698 | 10/1922 | Stephenson . | |
| 1,572,480 | 2/1926 | Hislop . | |
| 1,679,325 | 7/1928 | Black . | |
| 2,870,928 | 1/1959 | Haggard et al. | 254/131 |
| 3,007,263 | 11/1961 | Lair | 280/47.26 X |
| 3,900,202 | 8/1975 | Doble | 280/43.24 X |
| 4,335,897 | 6/1982 | Muller, Jr. . | |
| 4,349,210 | 9/1982 | Rutt | 280/47.26 X |
| 4,350,356 | 9/1982 | Crothers . | |
| 4,460,188 | 7/1984 | Maloof | 280/47.26 X |
| 4,471,996 | 9/1984 | Primeau . | |
| 4,660,850 | 4/1987 | Nakao et al. | 280/47.36 X |
| 4,789,171 | 12/1988 | Porter . | |
| 4,906,017 | 3/1990 | Kassai | 280/47.36 X |
| 5,313,817 | 5/1994 | Meinders | 280/47.24 X |

OTHER PUBLICATIONS

Rubbermaid Catalog, 1997, pp. 9, 18 and 19.

*Primary Examiner*—Michael Mar
*Attorney, Agent, or Firm*—Heisler & Associates

[57] ABSTRACT

A manually driven wheeled ground level loading cart 10 is provided. The cart 10 has a container 20 in which a load can be supported and a frame 40, pivotably attached to the container 20 and including a handle 44. The frame 40 can be pivoted with respect to the container 20 between two orientations including a loading orientation where the container 20 rests flat on the ground G and a transport orientation where the container 20 is supported through the frame 40 upon wheels 70. The cart 10 is maintained in the transport orientation by having a latching mechanism 80 releasably attached to a rear bar 35 affixed to the container 20. The wheels 70 are coupled through axles to the frame 40 at a location elevated above the pivotable attachment means between the frame 40 and the container 20. A latching mechanism 80 is located above the axles 73 of the wheels 70. The pivotable attachment means between the frame 40 and the container 20 is located closer to a loading lip 30 of the container 20 than to a back wall 24 of the container 20 to provide proper balance for the frame 40 and container 20 in both the loading orientation and the transport orientation. The latching mechanism 80 can be released from the rear bar 35 of the container 20 through rotation of a release bar 100 located adjacent the handle 44 on the frame 40.

12 Claims, 6 Drawing Sheets

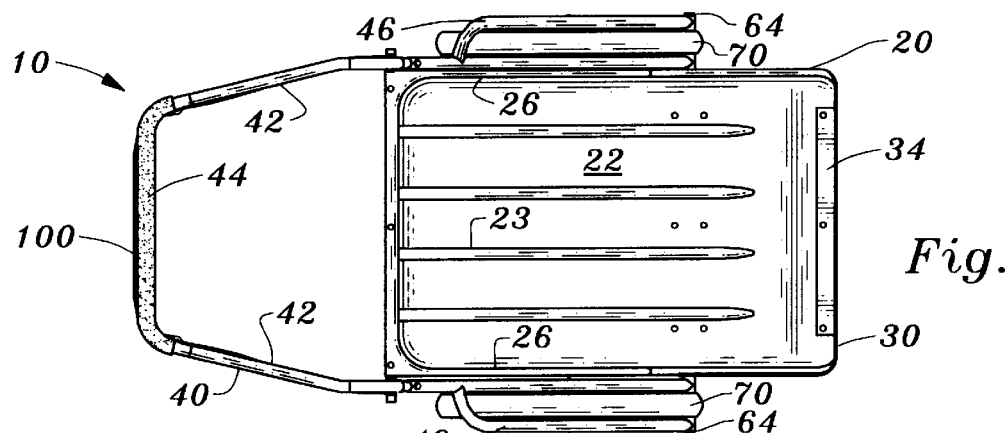
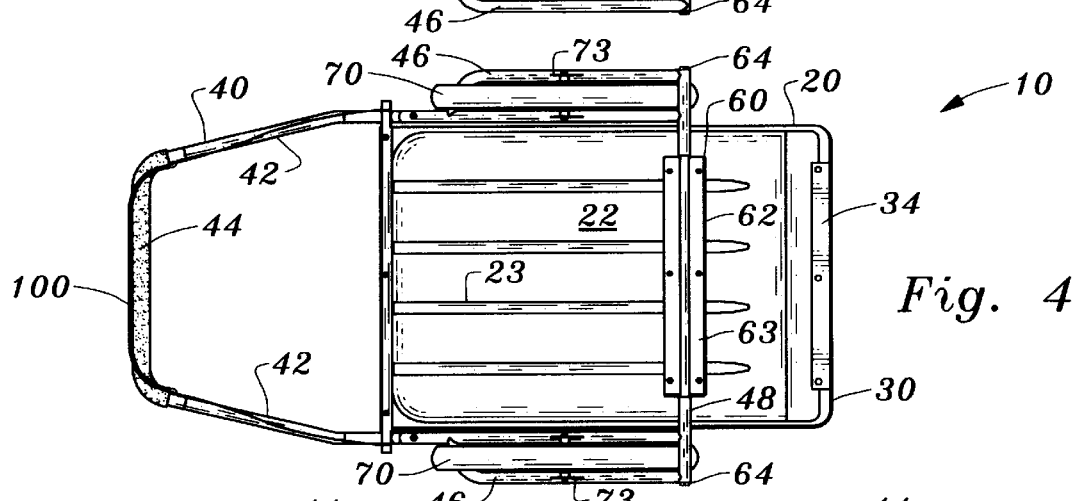
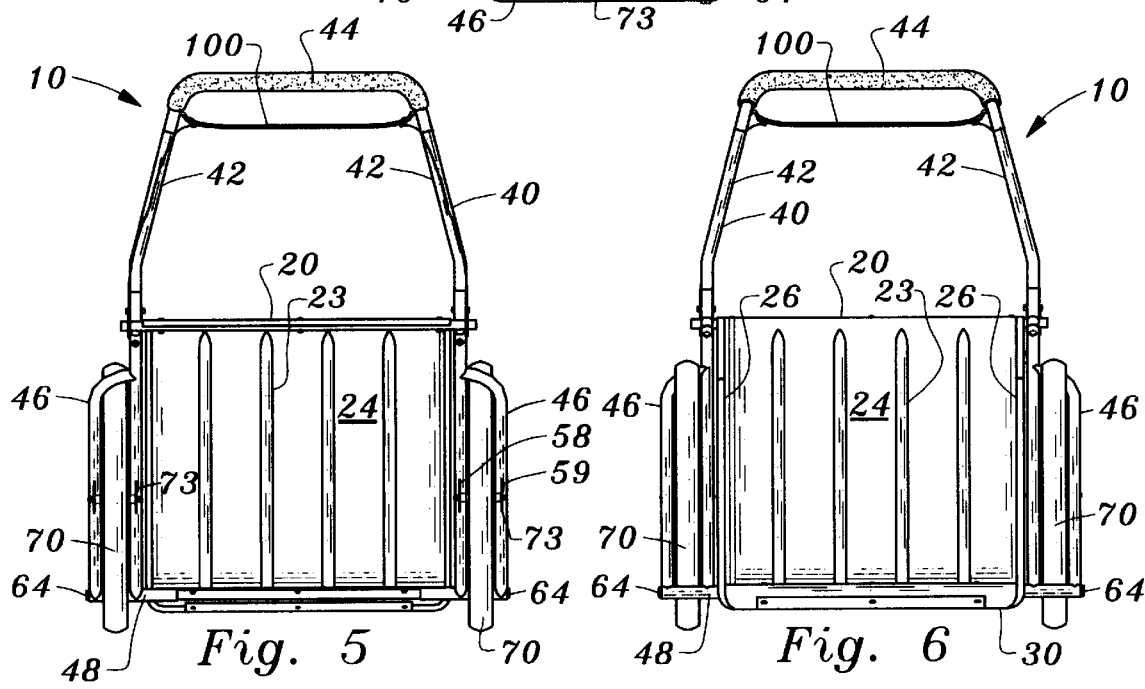

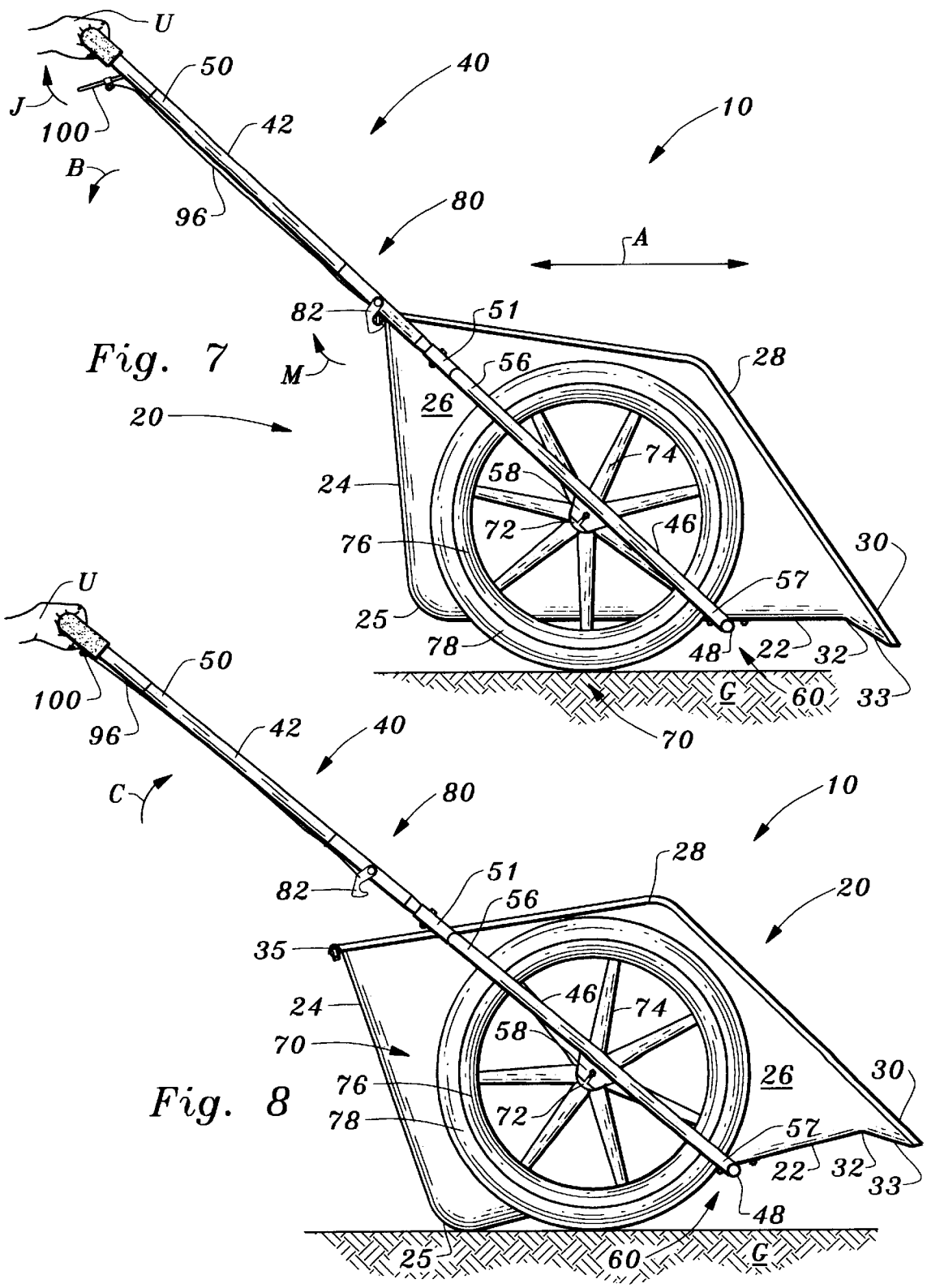

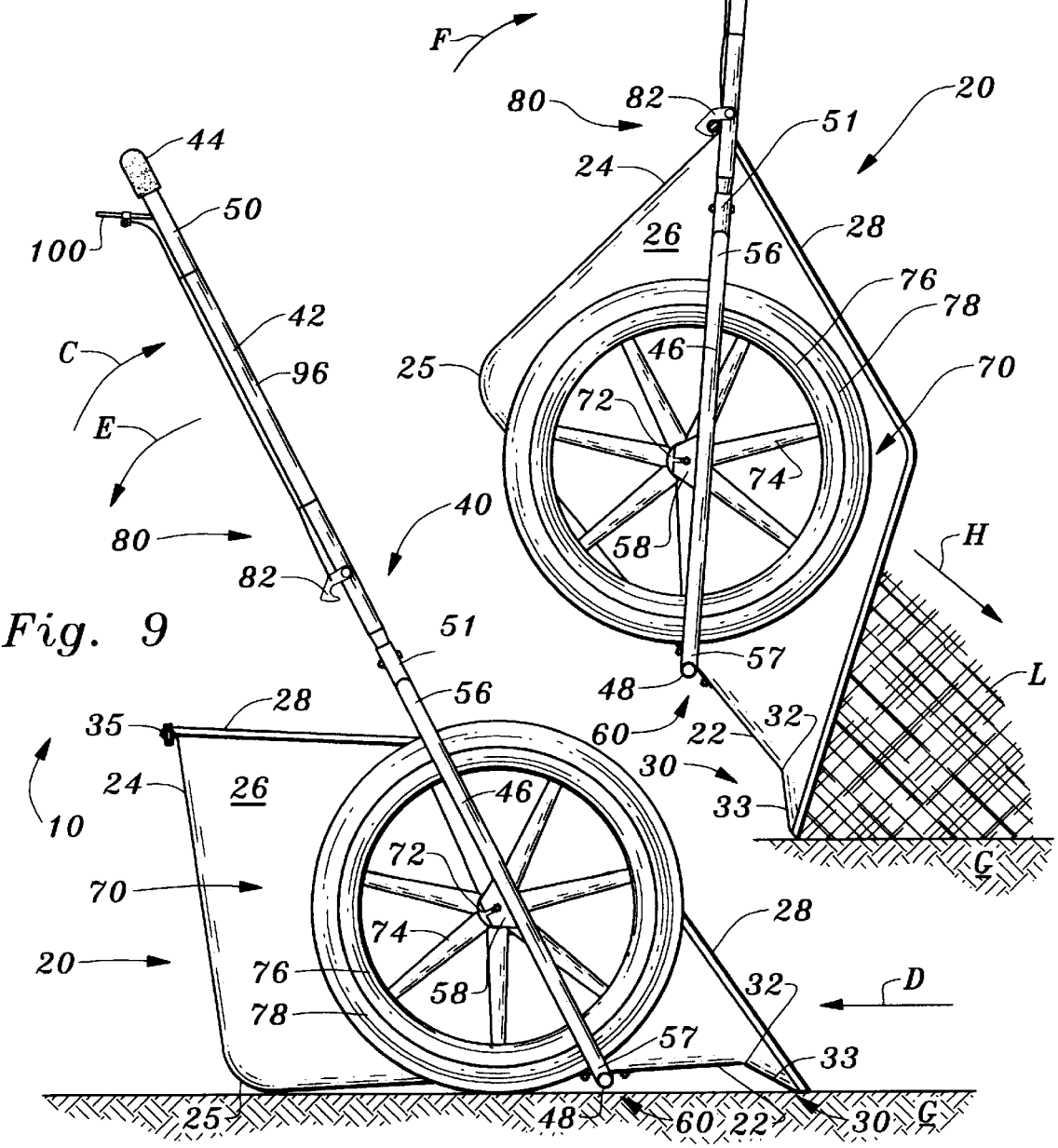

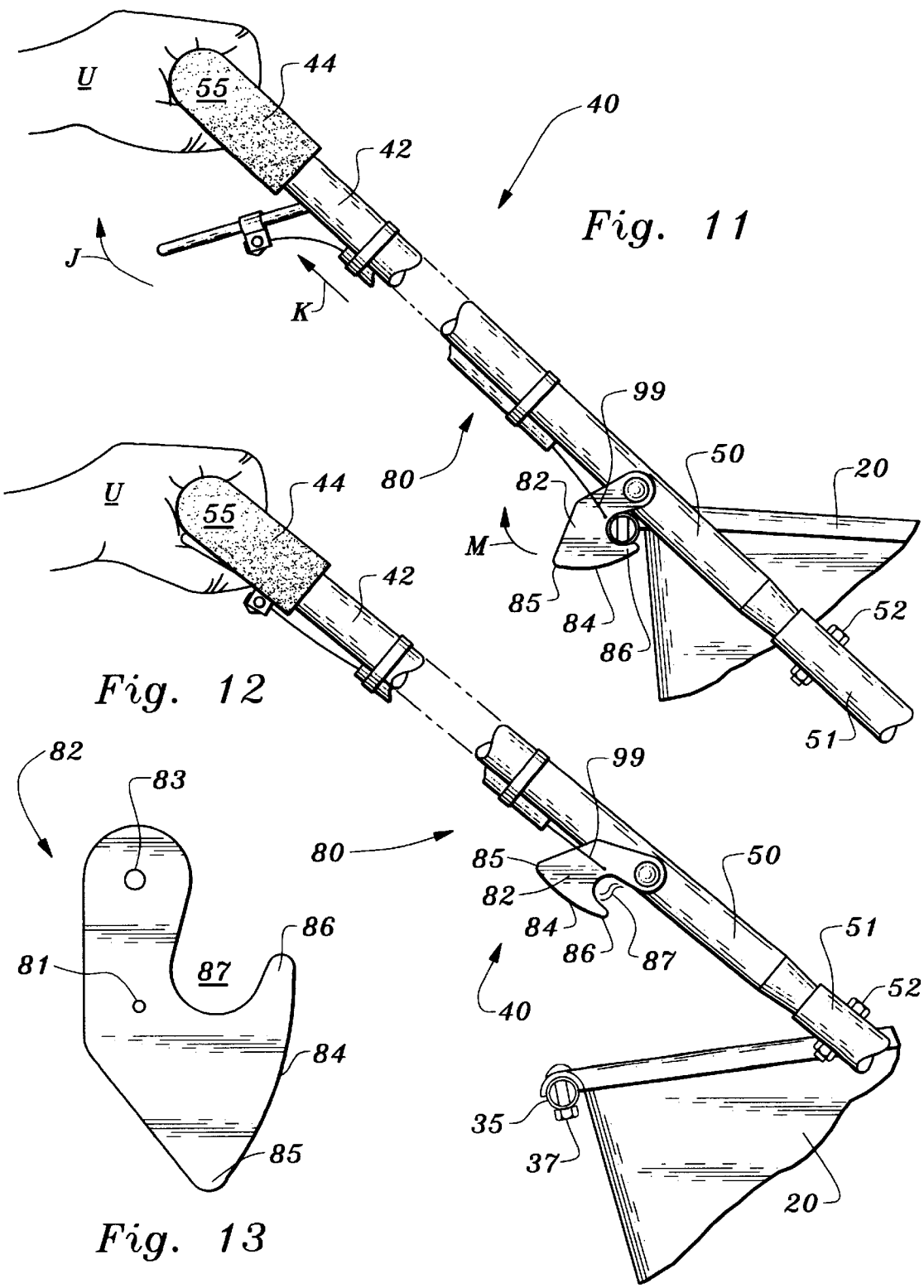

GROUND LEVEL LOADING CART

FIELD OF THE INVENTION

The following invention relates to manually driven wheeled carts for carrying loads. More specifically, this invention relates to carts which can have load carrying containers thereof oriented adjacent the ground for ease in placing loads into the container while in a ground loading orientation and then can be configured in a transport orientation where the container is elevated above the ground and supported upon wheels.

BACKGROUND OF THE INVENTION

When loads of loose articles are to be manually carried, a device commonly used for assistance is the wheelbarrow. However, wheelbarrows suffer from a variety of drawbacks. For instance, to load a wheelbarrow with items on the ground, the user must either bend down to pick up the items or utilize a tool such as a shovel, typically requiring the user to bend over and lift up the items in a repetitive fashion. Not only must the item to be loaded be lifted to a level even with a floor of the wheelbarrow but it must be additionally lifted over a rim of the wheelbarrow and then set down into the wheelbarrow. Additionally, the single wheel of the wheelbarrow provides lateral instability for the load and the user must exert significant steadying lateral forces to ensure that the load is not tipped, especially when traveling over uneven terrain. Numerous different manually driven carts have been developed to improve on the basic wheelbarrow. Some such carts enhance lateral stability by providing two wheels rotatable about a common axis and spaced on opposite sides of a container portion of the cart. Many of these carts additionally utilize large wheels to assist in rolling the carts over uneven terrain. For instance, page 9 of the 1997 Rubbermaid catalog published by Consolidated Plastics Company, Inc. of Twinsburg, Ohio shows large wheeled carts which utilize such a two wheel configuration. While such two wheel carts do provide additional ease in using the cart once a load is placed within the cart, these carts are not easily loaded and unloaded due to their single orientation significantly above ground level.

Other inventions are known which utilize two wheels and have multiple orientations to assist in loading container portions of such inventions. For instance, the wheel scoop taught by McCrary (U.S. Pat. No. 1,015,969) and the truck taught by Smith (U.S. Pat. No. 1,006,985) teach the use of two wheels attached to a frame with handles on the frame which can attach to a container portion in multiple different orientations. While the carts disclosed by the patents to McCrary and Smith do have orientations where a floor of the container portion of the cart is lowered for loading ease, these prior art devices still suffer from numerous drawbacks. Specifically, these devices; utilize small wheels located away from a front end of a container portion of the device. Hence, the handles must either be placed on the ground or supported in some fashion to keep the container portion in a loading configuration. Additionally, the rearward location of the wheels of these prior art devices increases an amount of force necessary to dump a load out of the container portion.

Accordingly, a need exists for a ground level loading cart which can rest in a ground loading orientation with a handle remaining above the ground and which can be easily shifted from a loading orientation to a transport orientation and have a load within a container thereof carried and dumped when desired.

SUMMARY OF THE INVENTION

This invention provides a ground level loading cart which has a container pivotably attached to a frame, with wheels and a handle for the cart attached to the frame. The frame can be rotated with respect to the container between a loading orientation and a transport orientation.

The container includes a floor, side walls and a back wall within which a load can be placed. When the cart is in the loading orientation, the floor of the container rests on the ground and material can be raked, swept, rolled or otherwise carried into the container by passing over a loading lip on an edge of the floor opposite the back wall. While in the loading orientation, the wheels are resting on the ground and the handle is supported in an elevated orientation where it can be easily grasped by a user.

The frame pivotably attaches to the container at a pivot bar which passes adjacent to and beneath the floor at a location on the floor closer to the loading lip than to the back wall. The frame extends up from the pivot bar to a handle along a pair of lever arms which extend around either side of the container and are joined together through the handle. Each lever arm includes a support for an axle of one of the wheels at a location on the frame above the pivot bar.

The frame also includes a means to releasably attach same to the container at a location between the handle of the frame and the pivot bar. The releasable attachment means is in the form of a latching mechanism along each lever arm which is configured to engage with a bar adjacent an upper portion of the back wall of the container. When the latching mechanism is latched to the rear bar of the container, the cart is in a transport orientation and the wheels are lowered below the floor of the container so that the container is elevated somewhat off the ground. The cart can then be manually driven over the ground with the container elevated above the ground supported by the frame and wheels.

When the latching mechanism is released from the rear bar and the handle is released, the container naturally assumes a loading orientation with the floor adjacent the ground with the handle extending upward and the wheels resting on the ground but not supporting the container above the ground. The latching mechanism is configured to easily grasp the rear bar when the handle is rotated downward but to resist release of the rear bar unless the latching mechanism is released and the container is on the ground to prevent dropping of the container. A release bar is oriented adjacent the handle which is manually rotatable to move the latching mechanism between a latched position and a released position.

OBJECTS OF THE INVENTION

Accordingly, a primary object of the present invention is to provide a cart which has a loading orientation in which a floor of the cart is resting on the ground and a loading lip is resting on the ground so that a load can be easily placed in the container and which has a transport orientation where the container is elevated above the ground and is supported upon wheels for manual transport.

Another object of the present invention is to provide a ground level loading cart which can be easily reconfigured between a loading orientation and a transport orientation.

Another object of the present invention is to provide a ground level loading cart which can be used to easily carry heavy loads over uneven terrain.

Another object of the present invention is to provide a ground level loading cart which can easily dump a load when required.

Another object of the present invention is to provide a ground level loading cart which is of durable construction for repetitive use in carrying heavy loads.

Another object of the present invention is to provide a ground level loading cart which is formed from materials which are resistant to corrosion and wear and which can be readily manufactured.

Another object of the present invention is to provide a ground level loading cart which has large wheels for ease in navigating rough terrain.

Other further objects of the present invention will become apparent from a careful reading of the included drawing figures, the claims and detailed description of the invention.

BRIEF DESCRIPTION OF THE DRAWINGS

FIG. 3 is a top plan view of that which is shown in FIG. 1.

FIG. 4 is a bottom plan view of that which is shown in FIG. 1.

FIG. 5 is a rear elevation view of that which is shown in FIG. 1.

FIG. 6 is a front elevation view of that which is shown in FIG. 1.

FIG. 7 is a side view of that which is shown in FIG. 1 while in a transport orientation.

FIG. 8 is a side elevation view of that which is shown in FIG. 7 while the cart of this invention is shifting from a transport orientation to a loading orientation.

FIG. 9 is a side elevation view of that which is shown in FIG. 7 with the cart of this invention shown in a loading orientation.

FIG. 10 is a side elevation view of that which is shown in FIG. 7 with the invention shown in a transport orientation and rotated about a loading lip sufficiently to cause dumping of a load out of a container portion of the cart of this invention.

FIG. 11 is a side elevation view of a portion of that which is shown in FIG. 1 revealing details of a latching mechanism between a frame of the invention and the container of the invention while the cart of this invention is in a transport orientation.

FIG. 12 is a side elevation view of a portion of that which is shown in FIG. 11 but while the latching mechanism is in a released configuration and the invention is in a loading orientation.

FIG. 13 is a plan view of a latch of the latching mechanism.

DESCRIPTION OF THE PREFERRED EMBODIMENT

Figures 1, 2:
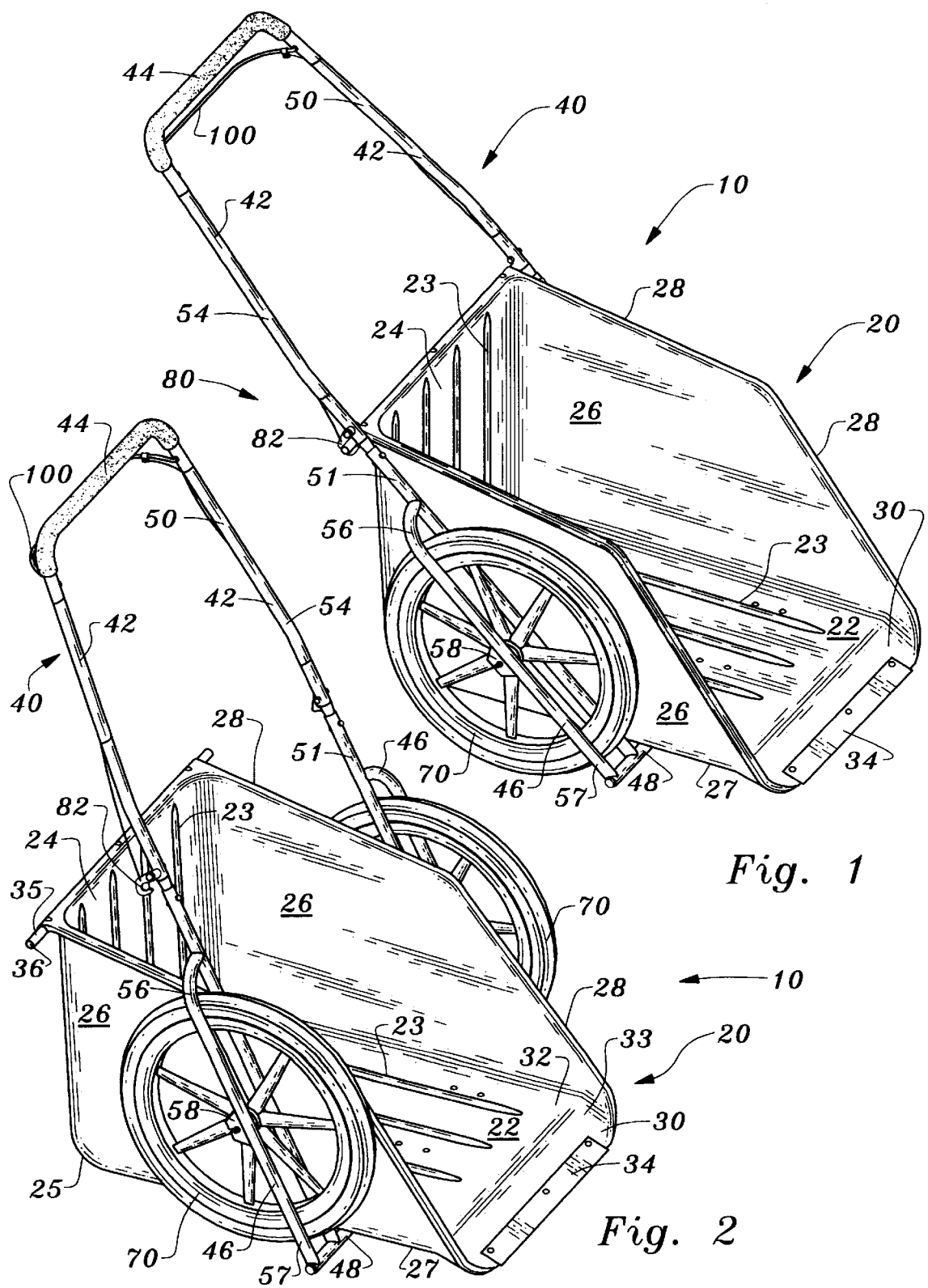
FIG. 1 is a perspective view of the ground level loading cart of this invention in a transport orientation.
FIG. 2 is a perspective view of that which is shown in FIG. 1 while in a loading orientation.

Referring to the drawings wherein like reference numerals represent like parts throughout the various drawing figures, reference numeral 10 is directed to a ground level loading cart which includes a container 20 pivotally attached to a frame 40 (FIG. 1). The cart 10 has a loading orientation where the container 20 rests upon the ground G (FIG. 9) and a transport orientation where the container 20 is elevated above the ground G by wheels 70 (FIG. 7).

In essence, and with particular reference to FIGS. 1 and 2, the ground level loading cart 10 includes the following primary features. The container 20 has a loading lip 30 at a lower forward edge of the container 20 which can rest adjacent the ground G for loading of material into the container 20 when the cart 10 is in the loading orientation (along arrow D of FIG. 9). The frame 40 pivotably attaches to the container 20 near the loading lip 30 through a pivot bar 48. The frame 40 has a handle 44 at an end of the frame 40 opposite the pivot bar 48. The pivot bar 48 is oriented within a pivot sleeve 60 (FIG. 4) attached to the container 20 so that the frame 40 can pivot with respect to the container 20. Wheels 70 are attached to the frame 40 adjacent sides of the container 20.

A latching mechanism 80 is located on the frame 40 and includes a latch 82 which can connect the frame 40 to a rear bar 35 attached to the container 20. When the latching mechanism 80 of the frame 40 is attached to the rear bar 35 of the container 20 the cart 10 is in its transport orientation. When the latching mechanism 80 is released from the rear bar 35 the cart is in its loading configuration. The location of the pivot bar 48 on the container 20 is carefully selected to provide proper balance for the container 20 and frame 40 so that the handle 44 of the frame 40 remains elevated when the cart 10 is in its loading configuration and so that the cart 10 can be easily transported upon the wheels 70 when the cart 10 is in its transport orientation.

More specifically, and with particular reference to FIGS. 1–10, details of the container 20 portion of the ground level loading cart 10 are described. The container 20 is an open rigid structure with an interior which is open above and on a forward side. The container 20 includes a substantially flat floor 22 with a plurality of stiffening ribs 23 extending front to back upon the floor 22. A back wall 24 extends up from a back bend 25 between the floor 22 and the back wall 24. The back wall 24 is also preferably substantially flat with ribs 23 located thereon. The back wall 24 is preferably not vertical but rather is angled about 95° away from the floor 22.

Two side walls 26 are oriented perpendicular to both the floor 22 and back wall 24. Side bends 27 provide a transition between the floor 22 and the side walls 26. A perimeter rim 28 defines an uppermost and forward most portion of the side walls 26 and uppermost portion of the back wall 24. Preferably, the perimeter rim 28 flares out away from an interior of the container 20 slightly.

The container 20 is formed in a unitary manner from an easily moldable material such as high density polyethylene or fiberglass. The perimeter rim 28 and ribs 23 provide enhanced stiffness for the container 20 and allow thicknesses of the floor 22 and walls 24, 26 to be thinner while still providing the container 20 with a high degree of strength.

A loading lip 30 defines an edge of the floor 22 opposite the back wall 24. The loading lip 30 preferably has a planar slope 33 which diverges from the floor 22 by an angle 32 (FIGS. 7–10). The angle 32 and slope 33 of the loading lip 30 lower the loading lip 30 slightly below the floor 22 to provide a ramp for sliding materials into the container 20 and still providing clearance beneath the floor 22 for the pivot sleeve 60 described in detail below. A reinforcement plate 34 is preferably oriented at a tip of the slope 33 of the loading lip 30 to reinforce the loading lip 30 and reduce a tendency for the loading lip 30 to wear from excessive use. The configuration of the loading lip 30 causes the floor 22 to be angled about 5° from the ground G with the back bend 25 resting on the ground G while the cart 10 is in the loading orientation.

The container 20 also contains a rear bar 35 adjacent the perimeter rim 28 and above the back wall 24. The rear bar 35 is substantially linear and preferably extends horizontally an entire width of the container 20 and has ends 36 which extend beyond the side walls 26 of the container 20. The ends 36 preferably extend sufficiently away from the side walls 26 so that the ends 36 prevent the frame 40 from rotating past the ends 36 of the rear bar 35. The ends 36 also provide an attachment location for a releasable attachment means on the frame 40 such as the latching mechanism 80.

The rear bar 36 is preferably formed from a steel or other high strength material and is attached to the other portions of the container 20 through bar bolts 37. The rear bar 35 is spaced away from a location adjacent the floor 22 where the pivot sleeve 60 attaches by a distance similar to a distance on the frame 40 between the pivot bar 48 and the latch 82 of the latching mechanism 80. Thus, the latch 82 of the latching mechanism 80 will align with the rear bar 35 when the frame 40 is rotated about the pivot sleeve 60 and pivot bar 48, as discussed in detail below.

With continuing reference to FIGS. 1–10, details of the frame 40 of the ground level loading cart 10 are described. The frame 40 is preferably a substantially rigid circuit of tubing including the handle 44 at an upper end, the pivot bar 48 at a lower end and a pair of lever arms 42 on either sides of the frame 40 and extending between the handle 44 and the pivot bar 48. Forks 46 are oriented parallel to the lever arms 42 and outboard of the lever arms 42 so that the wheels 70 can be securely oriented between one of the forks 46 and one of the lever arms 42 on either side of the frame 40.

For ease in breaking down the frame 40 for shipping or storage, the frame 40 is preferably divided into an upper half 50 and a lower half 51 which nest together approximately halfway along each of the pair of lever arms 42. A bolt and nut set 52 (FIGS. 11 and 12) can be utilized to secure the upper half 50 to the lower half 51 of the frame 40. The lever arms 42 of the frame 40 preferably angle together with a taper 54 so that the frame 40 is not quite as wide at the handle 44 as at the pivot bar 48. A grip 55 (FIGS. 14 and 15) can be oriented over the handle 44 to enhance ease with which a user U can grasp the handle 44. The grip 55 can either be a sleeve of easily held material or can be an appropriately frictional coating applied to the handle 44.

Each of the forks 46 extend from a fork upper end 56 down to a fork lower end 57 adjacent the pivot bar 48. The fork upper end 56 is spaced from the fork lower end 57 by a distance greater than a diameter of the wheels 70 so that the fork upper end 56 and fork lower end 57 will not rub against the wheels 70 when the fork upper end 56 and fork lower end 57 connect back to the lever arms 42 of the frame 40. A fork tab 58 extends from the fork 46 at a location approximately mid-way between the fork upper end 56 and the fork lower end 57. A lever tab 59 similar to the fork tab 58 (FIG. 5) extends away from the lever 42 at a location approximately mid-way between the pivot bar 48 and the location on the lever arm 42 where the fork upper end 56 attaches to the lever arm 42. As discussed below, the tabs 58, 59 support the wheels 70 between the forks 46 and the lever arms 42.

The pivot sleeve 60 is preferably affixed to an underside of the floor 22 of the container 20 and forms one portion of a pivotable attachment means between the frame 40 and the container 20. The pivot sleeve 60 includes a plate 62 which is attachable to the floor 22 of the container 20 such as with rivets, bolts or other fasteners and a channel 63 adjacent the plate 62. The channel 63 has an interior diameter similar to, but slightly larger than, that of the pivot bar 48 so that the pivot bar 48 can pass through the channel 63 and rotate within the channel 63 in the nature of a journal bearing. The pivot bar 48 extends out of the channel 63 with tips 64 (FIGS. 5 and 6) to which the fork lower ends 57 attach to the pivot bar 48.

Preferably, the ground level loading cart 10 includes two wheels 70 oriented to rotate about a common axis with one wheel 70 located on either side of the container 20 and with a central axis of the wheels 70 remaining close to a geometric center of the container 20 at all times to keep a majority of a load within the container supported by the wheels 70 rather than causing a significant load on the handle 44, which must be supported by the user U. Each wheel 70 additionally preferably has a diameter greater than a height of side walls 26 of the container 20. Each wheel 70 includes a hub 72 having an axle 73 passing there through and with spokes 74 radiating away from the hub 72. A rim 76 circumscribes the hub 72 at ends of the spokes 74 opposite the hub 72. The rim 76 supports a tire 78 which can either be pneumatic or of a solid configuration. By providing large wheels 70 for the cart 10, the cart 10 can easily pass over rough terrain without difficulty or significantly upsetting a load oriented within the container 20.

The axle 73 connects to the frame 40 between each fork tab 58 and lever tab 59 so that the axle 73 is rigidly attached to the frame 40. The hub 72 is rotatably supported on the axle 73 so that the wheels 70 can freely rotate with respect to the frame 40 but are prevented from translating linearly in any fashion relative to the frame 40. The wheels 70 are not connected to the container 20 except through the frame 40. When the frame 40 pivots about the pivot bar 48 the orientation of the wheels 70 relative to the container 20 is modified slightly as shown in FIGS. 7–10.

With particular reference to FIGS. 11–16 details of the latching mechanism 80 are described. The latching mechanism 80 of the preferred embodiment provides one form of releasable attachment means for attaching the frame 40 to the container 20 in a non-pivoting fashion. When the latching mechanism is released, the frame 40 can rotate freely relative to the container 20 to move the cart 10 between its transport orientation and its loading orientation. The frame 40 cannot rotate past the rear bar 35 on the container 20. Hence, the handle 44 of the frame 40 is kept above ground when the latching mechanism 80 is released and the container 20 is in a loading orientation.

Preferably, the latching mechanism 80 is positioned in an identical fashion to each lever arm 42 and is configured as follows. The latching mechanism 80 includes a latch 82 in the form of a thin planar rigid construct having a pivot hole 83 on one end thereof through which the latch 82 is pivotably attached to the lever arm 42. A cam surface 84 is located on a side of the latch 82 opposite the pivot hole 83 and extends from a tip 85 to a tooth 86. A slot 87 is located between the tooth 86 and the pivot hole 83. The cam surface 84 is generally arcuate and exhibits a constant radius of curvature between the tip 85 and the tooth 86. The cam surface 84 is configured so that when the latch 82 of the latching mechanism 80 is in an attached configuration but the latch 82 is spaced from the rear bar 35, and the frame 40 is rotated toward the rear bar 35 (such as along arrow E of FIG. 9) the cam surface 84 will impact the rear bar 35 at such an angle that the latch 82 will be caused to rotate about the pivot hole 83 until the tooth 86 passes over the rear bar 35 and the latch 82 snaps into place with the rear bar 35 located within the slot 87.

A boss 88 (FIG. 16) provides a bearing surface for attachment and support of the latch 82 adjacent the lever arm 42. The boss 88 is configured with one end having a cylindrical contour to mate securely against the upper half 50 of the lever arm 42 and with a boss hole 89 passing along a central axis of the boss 88. A helical latch spring 90 is sized to rest over the boss 88. The latch spring 90 has a reference end 91 adapted to reside within a reference hole 92 in the upper half 50 of the lever arm 42. A latch end 93 of the latch spring 90 is curved to pass through a spring hole 81 in the latch 82 and rotate with the latch 82. Alternatively, the latch end 93 can surround the latch 82 at a location below the pivot hole 83 and on a side of the latch 82 opposite the cam surface 84.

With the latch spring 90 in this orientation, the latch 82 is caused to be biased toward an attached orientation where the latching mechanism 80 is either secured to the rear bar 35 of the container 20 or is ready to be secured to the rear bar 35 of the container 20 upon location of the frame 40 appropriately to bring the latching mechanism 80 to abutment with the rear bar 35 of the container 20. The latch bolt 94 passes through the pivot hole 83, boss hole 89 and latch attachment hole 110 in the upper half 50 of the lever arm 42 and a latch nut 95 attaches to the latch bolt 94 to support the entire latching mechanism 80 adjacent the upper half 50 of the lever arm 42.

Figure 14:
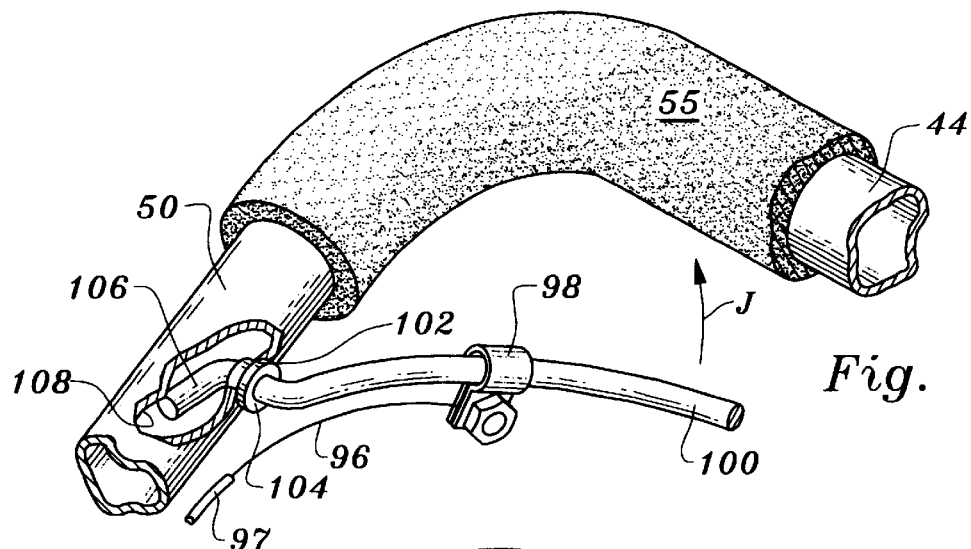
FIG. 14 is a perspective view of a portion of that which is shown in FIGS. 11 and 12 revealing how a release bar of the latching mechanism is configured when the latching mechanism is in a latched configuration.
Figure 15:
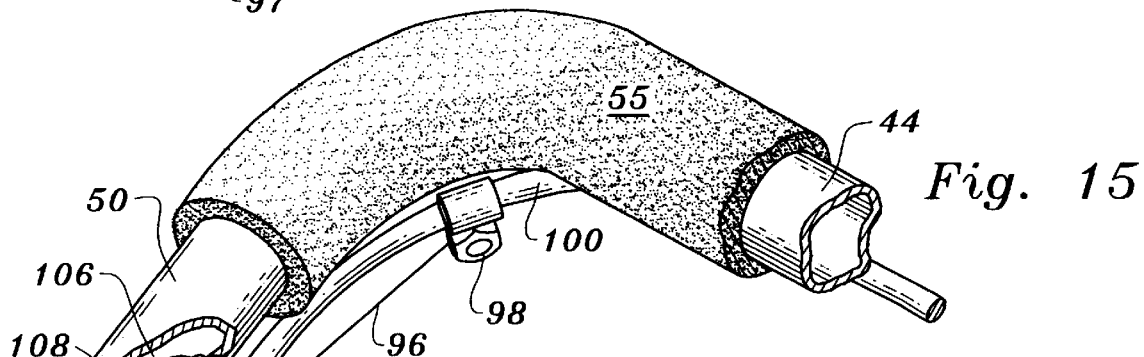
FIG. 15 is a perspective view of that which is shown in FIG. 14 while the latching mechanism is in a released configuration.
Figure 16:
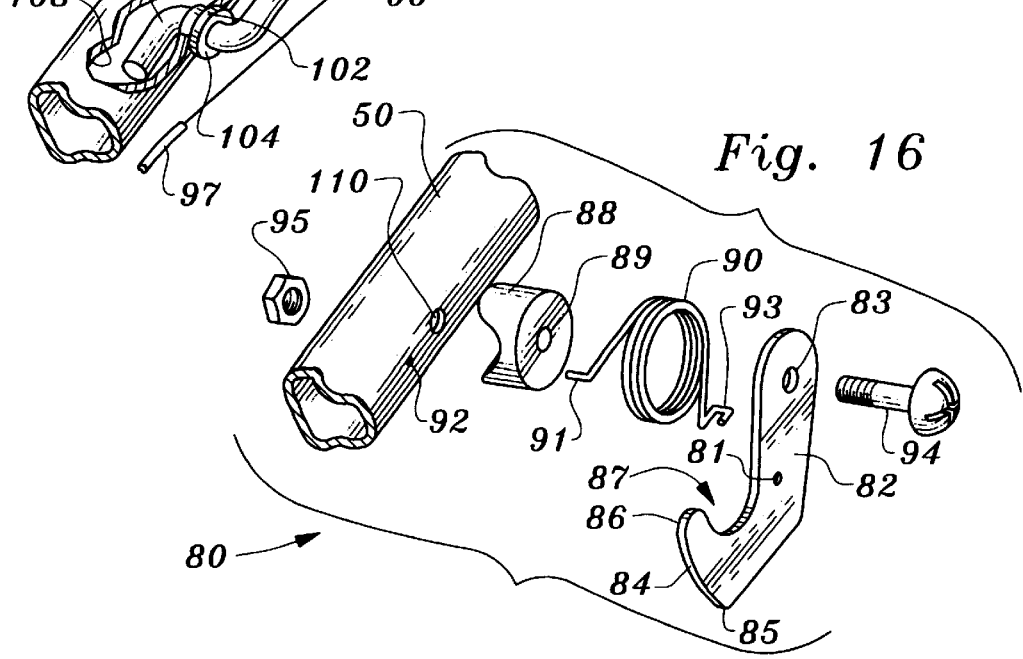
FIG. 16 is an exploded parts view of a portion of the latching mechanism revealing how the latching mechanism is configured and assembled.

To facilitate ease of release of the latching mechanism 80 so that the frame 40 can be rotated away from the rear bar 35 of the container 20 and the cart 10 can be placed in the loading orientation, a latch release portion of the latching mechanism 80 is provided. Specifically, a cable 96 is attached to each latch 82 at a cable attachment point 99 (FIGS. 11 and 12) at a location on the latch 82 spaced from the pivot hole 83. The cable 96 preferably passes through a sleeve 97 and extends from the latching mechanism 80 up to an upper cable bracket 98 (FIGS. 14 and 15). The sleeve 97 can be secured with straps to the upper half 50 of the lever arms 42 without inhibiting linear translation of the cable 96 within the sleeve 97.

The upper cable bracket 98 is attached to a release bar 100 which is pivotably attached to the lever arms 42 of the frame 40 in an orientation substantially parallel to the handle 44 of the frame 40. The release bar 100 can thus be rotated manually by the hands of user U. The release bar 100 is attached to the frame 40 through an attachment hole 102 which has a bushing 104 precluding the migration of moisture into an interior of the frame 40. A limit arm 106 extends from the release bar 100 within a hollow interior of the frame 40. The limit arm 106 has a length which causes the limit arm 106 to abut against an inner surface 108 of the lever arm 42 when the release bar 100 rotates downward too far.

The latch spring 90 causes the release bar 100 to be biased toward a lower position where the limit arm 106 abuts the inner surface 108. However, the release bar 100 can be rotated upward toward the handle 44 (along arrow J of FIGS. 7 and 11) by compressing the latch spring 90. When the latch spring 90 is compressed, the latch 82 is also rotated (along arrow M of FIGS. 7 and 11) causing the latch 82 to be placed in a detached configuration where the frame 40 can then be rotated away from the rear bar 35 (along arrow C of FIGS. 8 and 9) in a manner causing the cart 10 to be placed in a loading configuration.

In use and operation and with particular reference to FIGS. 7–10, details of the use of the ground level loading cart 10 and transformation of the ground level loading cart 10 between the loading orientation and the transport orientation is described. As shown in FIG. 7, the ground level loading cart 10 has a transport orientation where the latching mechanism 80 is latched to the rear bar 35 of the container 20 and the container 20 is elevated above the ground G and supported upon the wheels 70 through the frame 40. In this transport orientation the cart 10 can be easily translated along arrow A over the ground G.

When the user U has placed the cart 10 at a location where a load is to be placed within the container 20, the user U will transform the cart 10 from its transport orientation to its loading orientation. When the back bend 25 of the container 20 is above the ground G, the latch 82 of the latching mechanism 80 preferably cannot release from the rear bar 35 due to the length of the tooth 86 on the latch 82 and the provision of a slightly greater depth in the slot 87 than a size of the ends 36 of the rear bar 35. In essence, when the rear bar 35 is at a very bottom of the slot 87, the latch 82 cannot be rotated off of the rear bar 35. When the back bend 25 of the container 20 is resting upon the ground G the rear bar 35 is caused to move out of the slot 87 slightly and the latch 82 can then be rotated along arrow M (FIG. 7) by the user U grasping the handle 100 and rotating the handle 100 along arrow J (FIG. 7). This rotation of the handle 100 along arrow J and release of the latching mechanism 80 along arrow M would not occur until after rotation of the handle 44 and frame 40 along arrow B (FIG. 7) until the back bend 25 is resting upon the ground G (FIG. 8).

Once the back bend 25 is resting upon the ground G, the cart 10 is still in the transport orientation. However, resting the back bend 25 upon the ground G causes the rear bar 35 to pass out of the slot 87 in the latch 82 of the latching mechanism 80 sufficiently that the release bar 100 can now be rotated by a hand of the user U and the latch 82 released. The frame 40 can then be rotated along arrow C (FIG. 8) so that the frame 40 pivots about the pivot bar 48 and the frame 40 is reoriented relative to the container 20. This reorientation of the frame 40 continues along arrow C until the floor 22 of the container 20 is substantially parallel to the ground G (FIG. 9).

Once the floor 22 is resting on the ground G with both the back bend 25 and the loading lip 30 resting upon the ground G the cart 10 is in its loading orientation. Note that in its loading orientation the floor 22 is not directly adjacent the ground G but rather angles slightly up away from the back bend 25 and then down along the slope 33 of the loading lip 30. In this way the pivot sleeve 60 and pivot bar 48 have room to reside below the floor 22 of the container 20.

While in the loading configuration, the frame 40 and handle 44 are not resting down on the ground. Rather, the frame 40 is angled upwards with the handle 44 in a position where it can be easily grasped by a user U without having to bend down to reach the handle 44. A load L can then be placed within the container 20 such as by raking or sweeping the load L along arrow D over the loading lip 30 and into the container 20. Items can similarly be carried and then placed within the container 20. Once the container 20 has been loaded as desired, the frame 40 is rotated along arrow E (FIG. 9) until the frame 40 is again adjacent the ends 36 of the rear bar 35. While the release bar 100 can be rotated along arrow J to facilitate coupling of the latching mechanism 80 to the rear bar 35, this is not necessary. Rather, as the frame 40 is rotated along arrow E the latch 82 will impact the rear bar 35 at the cam surface 84 of the latch 82. The cam surface 84 is curved so that as the frame 40 continues to be rotated along arrow E the latch 82 is caused to rotate along arrow M (FIG. 7) until the tooth 86 passes over the rear bar 35. The latch spring 90 then causes the latch 82 to snap over the rear bar 35 with the rear bar 35 securely located within the slot 87 and the latch 82. The cart 10 is then in its transfer orientation as shown in FIG. 7.

The cart 10 can then be moved to the location at which it is desired that the load L be removed from the cart 10. If desired, the load L can be dumped from the cart 10 by rotating the frame 40 along arrow F (FIG. 10). Because the latching mechanism 80 remains attached to the rear bar 35, rotation of the frame 40 along arrow F causes the entire cart 10 to pivot about the loading lip 30. The load L is then dumped out of the container 20 along arrow H (FIG. 10). Once the load L has been removed from the container 20, the cart 10 can be reoriented upon the wheels 70 and then transported to a new location where yet another load L is to be moved.

This detailed description is provided to disclose a preferred embodiment of the invention and a best mode for practicing the invention. However, it should be apparent that various different modifications can be made to the preferred embodiment without departing from the scope and fair meaning of this disclosure and the claims.

What is claimed is:

1. A manually driven wheeled cart capable of being loaded at ground level, comprising in combination:

a container having a planar floor portion, a pair of side walls extending upwardly from lateral edges of said floor portion, a back wall extending upwardly from a back edge of said floor portion and a loading lip extending forwardly and downwardly from a forward edge of said floor portion, said loading lip locatable abutting the ground;

a frame including a handle and supports for axles of at least two wheels, one of said two wheels located on a first side of said container and another of said two wheels located on a second side of said container, said frame having a pair of arms extending along opposite sides of said container, each said arm supporting one of said axles of said wheels, said handle interconnecting rearward ends of said pair of arms;

a pivot bar interconnecting forward ends of said pair of arms, said pivot bar being pivotably attached to a bottom surface of said floor portion of said container at a location rearwardly of the forward edge of the floor portion;

said pivot bar being spaced from said supports for said axles of said wheels; and latching mechanisms associated with said pair of arms for releasably latching said pair of arms to a rear bar attached to an upper end of said back wall for moving the container to an elevated position relative to said two wheels.

2. The cart of claim 1 wherein said supports for said axles of said wheels are located above said pivot bar.

3. The cart of claim 1 wherein said pivot bar is pivotably attached to the floor portion at a location closer to said loading lip than to said back wall.

4. The cart of claim 1 wherein said wheels have a diameter greater than a height of said container.

5. A manually driven wheeled cart featuring a ground loading orientation and a transport orientation, comprising in combination:

a container having a planar floor portion, a pair of side walls extending upwardly from lateral edges of said floor portion, a back wall extending upwardly from a back edge of said floor portion and a loading lip extending forwardly and downwardly from a forward edge of said floor portion, said loading lip located abutting the ground when said cart is in said ground loading orientation and located spaced from the ground when said cart is in said transport orientation;

a frame including a pair of arms extending along opposite side walls of said container, a pivot bar interconnecting forward ends of said pair of arms, means to releasably attach said pair of arms to said container at an attachment location adjacent an upper end of said back wall when said cart is in said transport orientation, a handle, and supports for axles of at least two wheels, each said arm supporting an axle of said wheels, said handle interconnecting rearward ends of said pair of arms, said pivot bar being pivotably attached to a bottom surface of said floor portion of said container at a location rearwardly of said forward edge of said floor portion;

said wheels oriented to rotate about a common axis;

said pivot bar being spaced from said supports for said axles of said wheels; and wherein said lip extends beyond said wheels and beyond said pivot bar.

6. The cart of claim 5 wherein said handle is located above said attachment location of said container, said releasable attachment means preventing said frame from pivoting past said attachment location of said container, such that said frame has a handle thereof located above the ground when said cart is in both said loading orientation and said transport orientation.

7. The cart of claim 5 wherein said releasable attachment means includes means to automatically attach said frame to said container when said releasable attachment means of said frame is rotated about said pivot bar to said attachment location.

8. The cart of claim 7 wherein a bar is located at said attachment location and said releasable attachment means includes a spring biased latch on said frame, both said bar and said latch being spaced from said pivot bar a similar amount such that said latch locks to said bar when said frame is rotated until said latch is at said attachment location.

9. The cart of claim 8 wherein said latch includes means to remain locked to said bar unless said floor portion of said container is abutting the ground.

10. The cart of claim 5 wherein said releasable attachment means includes a release bar adjacent said handle, said release bar including means to release said releasable attachment means from said container, and allowing said frame to rotate about said pivot bar relative to said container such that said cart is converted from said transport orientation to said loading orientation.

11. The cart of claim 5 wherein said supports for said axles of said wheels are located above s;aid pivot and said attachment location for said releasable attachment means is locate d above said supports for said axles of said wheels.

12. The cart of claim 5 wherein said pivot bar is located closer to said loading lip of said floor portion than to said back wall of said container.

* * * * *